United States Patent [19]
Endo et al.

[11] Patent Number: 5,933,440
[45] Date of Patent: Aug. 3, 1999

[54] ELECTRONIC-LASER SYSTEM FOR OUTPUTTING RADIO-FREQUENCY SIGNAL AND PULSE LASER BEAM SYNCHRONOUS WITH RADIO-FREQUENCY SIGNAL

[75] Inventors: Akira Endo, Fujisawa; Masakazu Washio, Yokohama, both of Japan

[73] Assignee: Sumitomo Heavy Industries, Ltd., Tokyo, Japan

[21] Appl. No.: 09/109,739

[22] Filed: Jul. 2, 1998

[30] Foreign Application Priority Data

Jul. 8, 1997 [JP] Japan .................................. 9-182789

[51] Int. Cl.[6] ....................................................... H01S 3/10
[52] U.S. Cl. .............................. 372/22; 372/12; 372/13; 372/27; 372/74; 372/82
[58] Field of Search ................................ 372/22, 12, 13, 372/27, 106, 29, 74, 81, 82

[56] References Cited

U.S. PATENT DOCUMENTS

Re. 35,215  4/1996  Waarts et al. ............................. 372/22
3,995,231  11/1976  Johnson et al. .

OTHER PUBLICATIONS

K.K. Geissler: "Generation of Short laser Pulses", Nuclear Instruments & Methods in Physics Research, Section –A: Accelerators, Spectrometers, Detectors and Associated Equipment, vol. 340, 1996, pp. 52–73, XP000435007 Amsterdam, NL –*pp. 66 –71; figures 23–28*.

*Primary Examiner*—Leon Scott, Jr.
*Attorney, Agent, or Firm*—Frishauf, Holtz, Goodman, Langer & Chick, P.C.

[57] ABSTRACT

A master radio-frequency signal output from a master oscillator is input to a frequency converter. The frequency converter generates and outputs a multiplied signal having a frequency higher than that of the master radio-frequency signal by using the master radio-frequency signal. A loss of light reciprocating in an optic resonator of a laser oscillator is controlled by both the master radio-frequency signal output from the master oscillator and the multiplied signal output from the frequency converter. It is possible to highly precisely synchronize a pulse laser beam and a radio-frequency signal.

10 Claims, 6 Drawing Sheets ously with the applied radio-frequency signal.
ELECTRONIC-LASER SYSTEM FOR OUTPUTTING RADIO-FREQUENCY SIGNAL AND PULSE LASER BEAM SYNCHRONOUS WITH RADIO-FREQUENCY SIGNAL This application is based on Japanese Patent Application No. HEI-9-182789 filed on Jul. 8, 1997, the entire contents of which are incorporated herein by reference.

BACKGROUND OF THE INVENTION a) Field of the Invention

The present invention relates to an electronic-laser system, and more particularly to an electronic-laser system for outputting a radio-frequency signal and a pulse laser beam synchronous with the radio-frequency signal.

b) Description of the Related Art

An acoustic-optic mode locked laser oscillator is known which outputs a laser beam locked in the phase of a master radio-frequency signal.

The acoustic-optic mode locked laser oscillator has an acoustic-optic device in an optical path of an optic resonator. Upon application of a radio-frequency signal, the acoustic-optic device generates a standing wave in a laser beam transmission medium to Bragg-reflect a laser beam. The amount of Bragg reflection changes with a displacement amount of each position in the transmission medium, and the transmission loss of the optic resonator changes synchronously with the applied radio-frequency signal.

Laser oscillation occurs only when an amplification amount of a laser beam in a stimulated emission part and a loss amount of the laser beam in the acoustic-optic device satisfy particular conditions. When the conditions are satisfied, a pulse laser beam is output synchronously with the radio-frequency signal applied to the acoustic-optic device.

A pulse electron beam is obtained by applying a pulse laser beam to a photocathode and accelerating emitted photoelectrons in an acceleration cavity. In this case, it is necessary to synchronize a radio-frequency electric field induced in the acceleration cavity with a pulse laser beam applied to the photocathode. By using the acoustic-optic mode locked laser oscillator, a pulse laser beam can be locked in a radio-frequency signal.

An upper frequency limit of a radio-frequency signal applied to the acoustic-optic device of an acoustic-optic mode locked laser oscillator is about 500 MHz. In contrast with this, the frequency of a signal applied to the acceleration cavity to accelerate photoelectrons emitted from a photocathode is about several GHz. This signal is therefore obtained from a radio-frequency signal applied to the acoustic-optic device, by multiplying it with a frequency converter. The multiplied signal is applied to the acceleration cavity. The multiplied signal is power-amplified before it is applied to the acceleration cavity. While this radio-frequency signal is multiplied by the frequency converter and amplified by an amplifier, a phase of the radio-frequency signal shifts. As the pulse width of a pulse electron beam becomes narrow, this phase shift poses some problem.

SUMMARY OF THE INVENTION

It is an object of the present invention to provide an electronic-laser system capable of highly precisely synchronizing a pulse laser electron beam with a radio-frequency signal.

It is another object of the present invention to provide an electronic-laser system capable of generating a ultra short pulse laser beam by making a pulse electron beam collide with a pulse laser beam.

According to one aspect of the present invention, there is provided an electronic-laser system comprising: master signal generating means for generating a master radio-frequency signal; a frequency converter for receiving the master radio-frequency signal output from the master signal generating means and generating a multiplied signal having a frequency higher than the master radio-frequency signal by using the master radio-frequency signal; and a laser oscillator whose loss of light reciprocating in an optic resonator of the laser oscillator is controlled by both the master radio-frequency signal output from the master signal generating means and the multiplied signal output from the frequency converter.

A loss of light in the optic resonator is controlled not only by the master radio-frequency signal but also by the multiplied signal, and laser oscillation can be effected synchronously with both the signals. It is therefore possible to highly precisely synchronize a pulse laser beam output from the laser oscillator and the multiplied signal.

As above, laser oscillation is effected through double-lock in both the master radio-frequency signal and its multiplied signal. It is therefore possible to highly precisely synchronize a laser beam with the master radio-frequency signal and its multiplied signal. If this laser beam is applied to a photocathode to emit photoelectrons and the photoelectrons are accelerated by a radio-frequency electric field synchronously with the multiplied signal, then a ultra short pulse electron beam can be generated.

If an electron beam obtained by accelerating the ultra short pulse electron synchronously with the multiplied signal by an accelerator is made to collide with a laser beam oscillating synchronously with the multiplied signal, a ultra short pulse X ray can be generated. Since both the pulse electron beam and the pulse laser beam are synchronized with the multiplied signal with a high precision, a collision probability of both the beams can be made high.

DETAILED DESCRIPTION OF THE PREFERRED EMBODIMENTS

Figure 1:
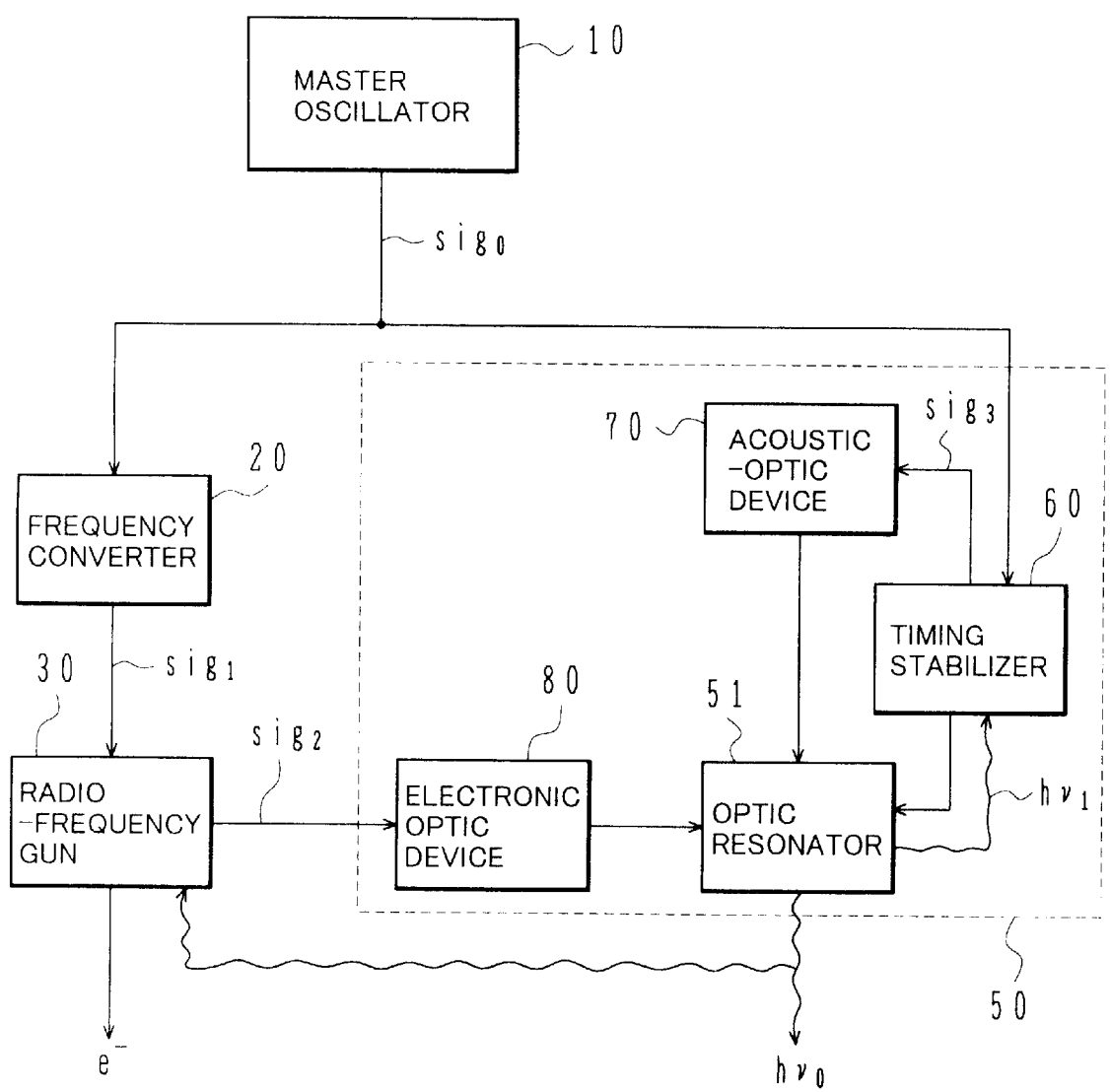
FIG. 1 is a block diagram showing an electronic-laser system according to an embodiment of the invention.

FIG. 1 is a block diagram of an electronic-laser system according to an embodiment of the invention. The electronic-laser system of this embodiments is constituted of a master oscillator 10, a frequency converter 20, a radio-frequency electron gun (RF gun) 30, and a laser oscillator 50.

The master oscillator 10 generates a master RF signal $sig_0$ having a stable frequency of, e.g., 119 MHz. This master RF signal $sig_0$ is supplied to the frequency converter 20 and laser oscillator 50. For example, the frequency converter 20 multiplies the input master RF signal $sig_0$ by 24 and outputs a multiplied signal $sig_1$ having a frequency of 2856 MHz. This multiplied signal $sig_1$ is supplied to the RF gun 30.

Figure 2:
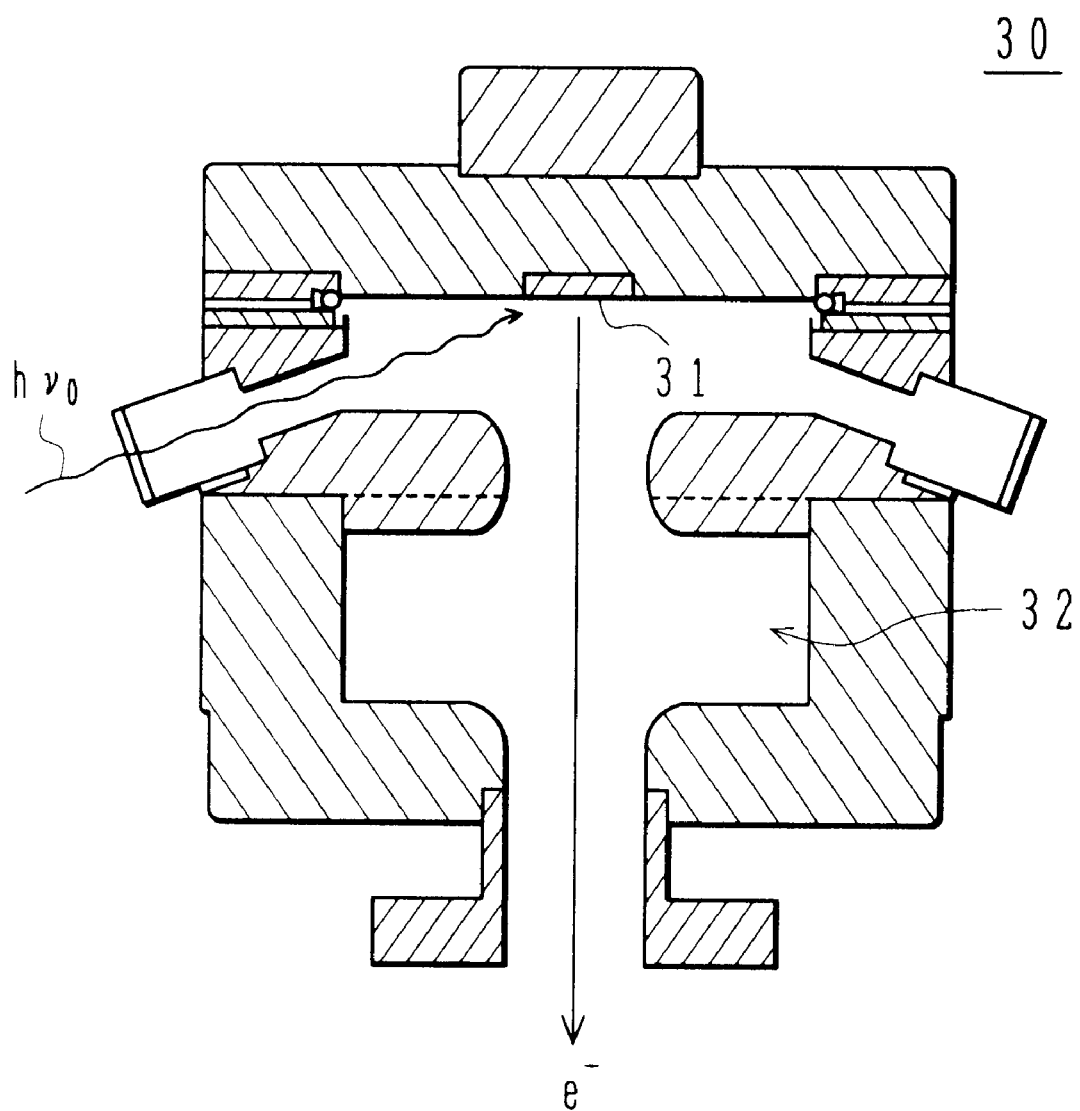
FIG. 2 is a cross sectional view of an RF gun to be used by the embodiment of the invention.

FIG. 2 shows the structure of the RF gun 30. The RF gun 30 is constituted of a photocathode 31 and an acceleration cavity 32. A pulse laser beam $hv_0$ output from the laser oscillator 50 is incident upon the photocathode 31 to emit photoelectrons. The multiplied signal $sig_1$ output from the frequency converter 20 is applied to an acceleration cavity 32 to induce an RF electric field in the acceleration cavity 32. The photoelectrons emitted from the photocathode 31 are accelerated by the RF electric field to generate a pulsating electron beam $e_0$.

Reverting to FIG. 1, the laser oscillator 50 will be described. The laser oscillator 50 is constituted of an optic resonator 51, a timing stabilizer 60, an acoustic-optic device 70, and an electronic-optic device 80.

The timing stabilizer 60 detects a phase shift between a pulse laser beam $hv_1$ output from the optic resonator 51 and the master RF signal $sig_0$. In accordance with the detected phase shift, the timing stabilizer 60 outputs an RF signal $sig_3$ having a shifted phase of the master RF signal $sig_0$. This RF signal $sig_3$ is applied to the acoustic-optic device 70. In accordance with also the detected phase shift, an optical path length of the optic resonator 51 is changed.

The acoustic-optic device 70 changes a transmission loss of a light beam reciprocally moving in the optic resonator 51, synchronously with the RF signal $sig_3$ supplied from the timing stabilizer 60.

The electronic-optic device 80 changes a transmission loss of a light beam reciprocally moving in the optic resonator 51, synchronously with an RF signal $sig_2$ derived from the RF electric field in the acceleration cavity of the RF gun 30. This transmission loss may be changed synchronously with the multiplied signal $sig_1$ output from the frequency converter 20.

The optic resonator 51 emits a laser beam which synchronizes with or double-locks in the RF signal $sig_3$ of 119 MHz and the RF signal $sig_2$ of 2856 MHz. As compared to the case wherein the laser beam locks in only the RF signal $sig_3$, the phase of the RF electric field in the acceleration cavity of the RF gun 30 and the phase of the pulse laser beam $hv_0$ can be locked together more precisely.

In the above manner, the phases of the pulse electron beam $e_0$ radiated from the RF gun 30 and the pulse laser beam $hv_0$ emitted from the laser oscillator 50 can be locked together with high precision.

Next, with reference to FIG. 3 and FIGS. 4A and 4B, the operation principle of the laser oscillator 50 will be described.

Figure 3:
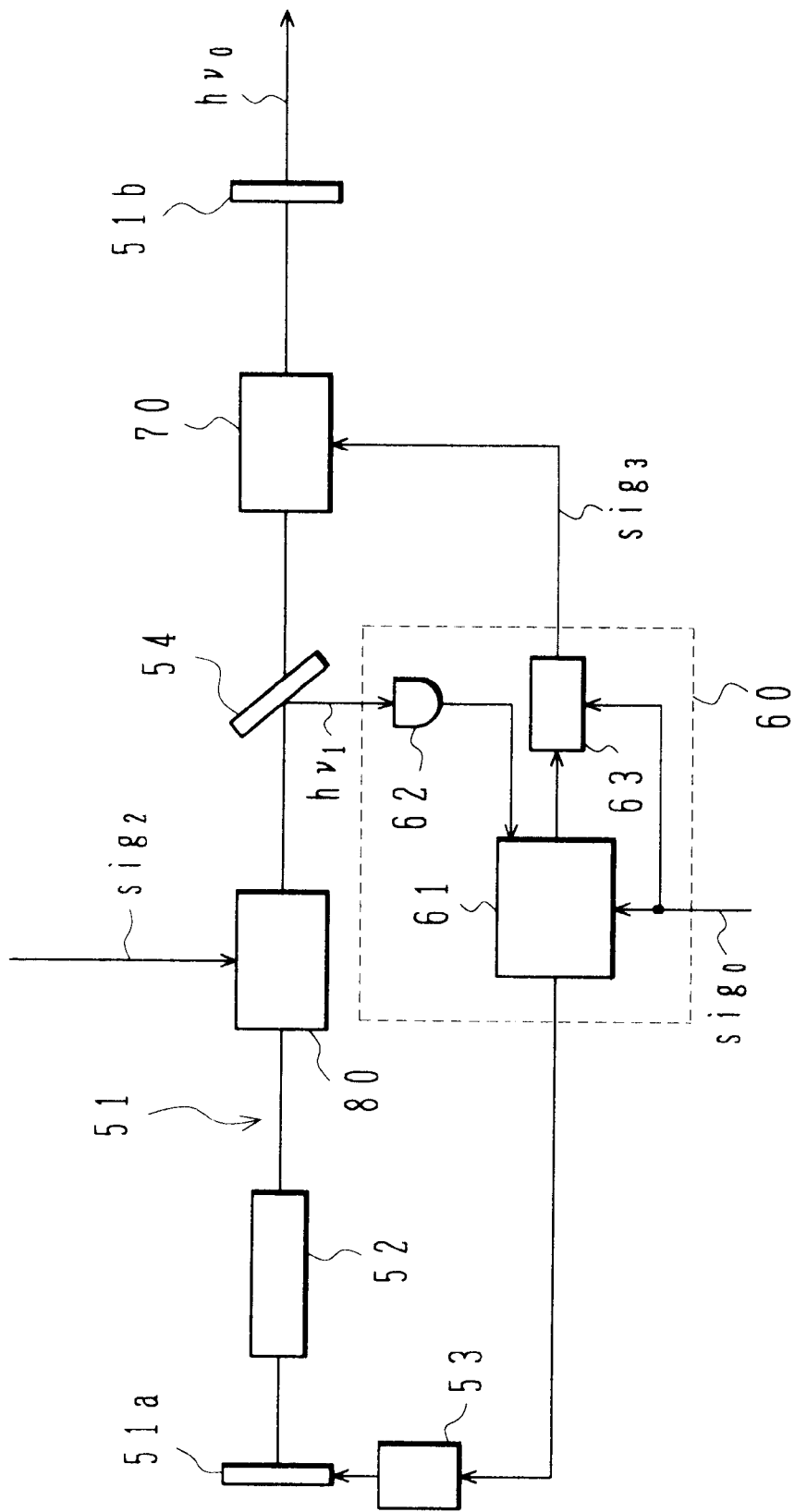
FIG. 3 is a schematic diagram showing the outline structure of a laser oscillator shown in FIG. 1.

FIG. 3 is a schematic diagram showing the outline structure of the laser oscillator 50. The laser oscillator 50 is constituted of: the optic resonator 51 including a total reflection mirror 51a and a partial transmission mirror 51b; a laser crystal 52 disposed along an optical path of the optic resonator 51: the acoustic-optic device 70; the electronic-optic device 80, a polarizer 54, and the timing stabilizer 60. The position of the total reflection mirror 51a is controlled by a piezoelectric device 53. By moving this total reflection mirror 51a, a length of the optic resonator 51 can be changed.

The timing stabilizer 60 is constituted of a phase detector 61, a photodiode 62, and a phase shifter 63. The photodiode 62 detects a laser beam excited in the optic resonator 51 and converts it into an electrical signal which is input to the phase detector 61.

The phase detector 61 compares the phase of the electrical signal input from the photodiode 62 with the phase of the master RF signal $sig_0$. A phase comparison result between the two signals is input to the phase shifter 63. In accordance with the phase comparison result between the two signals, the piezoelectric device 53 is controlled in such a manner that the length of the optic resonator 51 changes so as to reduce the phase shift amount.

In accordance with the phase comparison result supplied from the phase detector 61, the phase shifter 63 shifts the phase of the master RF signal $sig_0$ in such a manner that the phase shift amount between the two signals is reduced. The phase shifted RF signal $sig_3$ is applied to the acoustic-optic device 70.

Next, with reference to FIGS. 4A and 4B, the operation principle of the acoustic-optic device 70 will be described.

Figure 4A:
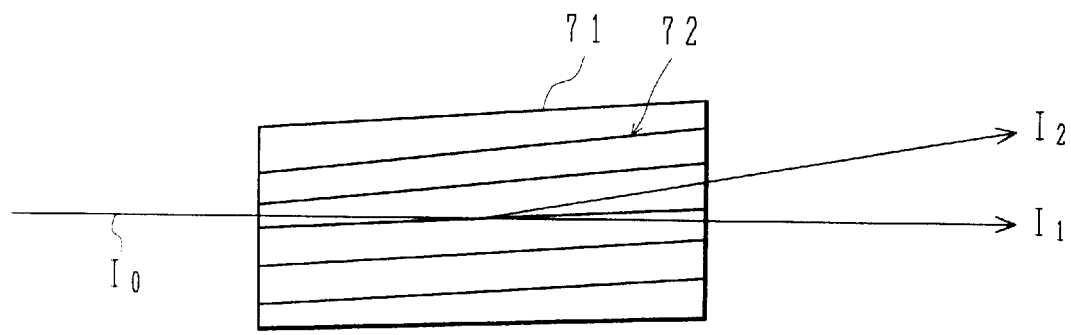
FIG. 4A is a conceptual diagram illustrating an operation principle of an acoustic-optic device used by the laser oscillator shown in FIG. 3.

FIG. 4A is a schematic diagram showing an optical medium 71 of the acoustic-optic device 70. As the phase shifted signal $sig_3$ is applied to the acoustic-optic device 70, a standing wave is generated in the optical medium 71 synchronously with the signal $sig_3$. Parallel lines 72 shown in FIG. 4A indicate equiphase fronts of the standing wave. The laser beam propagating along an optical axis $I_0$ of the optic resonator is partially Bragg-reflected by the standing wave, and then propagates along an optical axis $I_2$. If a displacement of each position of the optical medium 71 is near 0, this Bragg reflection hardly occurs and most of the laser beam components propagate straightly along an optical axis $I_1$. The laser beam components Bragg-reflected and propagating along the optical axis $I_2$ correspond to a loss of the optic resonator.

Figure 4B:
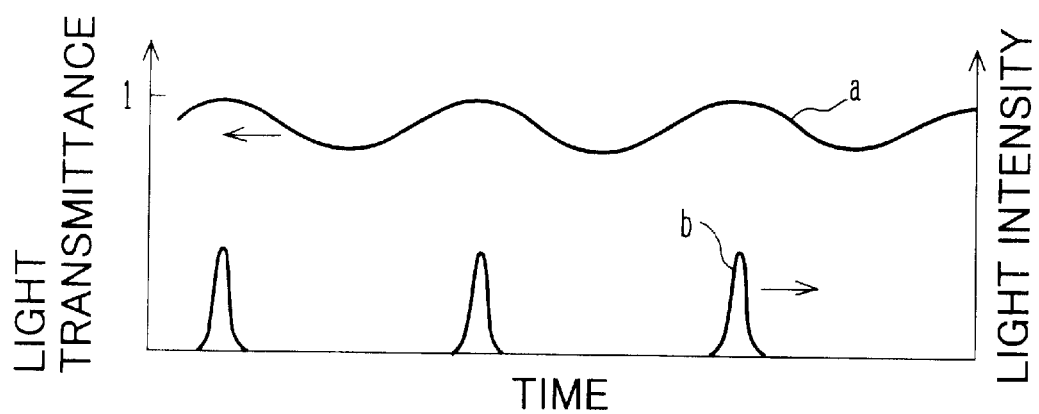
FIG. 4B is a graph showing a relation between a change in light transmittance and a change in light intensity, with time, of the acoustic-optic device.

FIG. 4B shows a phase relation between a transmittance of the acoustic-optic device 70 and an emitted laser beam. The abscissa represents a time, the left ordinate represents a transmittance, and the right ordinate represents an intensity of an emitted laser beam. A curve a shows the transmittance and a curve b shows an intensity of an emitted laser beam.

The transmittance of the acoustic-optic device 70 changes synchronously with the applied RF signal $sig_3$. When a displacement of each position of the optical medium 71 is 0, Bragg reflection does not occur and the transmittance is nearly 0. Under this condition, laser oscillation occurs and a pulse laser beam is emitted synchronously with the RF signal $sig_3$ applied to the acoustic-optic device 70.

Reverting to FIG. 3, the operation of the electronic-optic device 80 will be described. The electronic-optic device 80 is made of a Pockels device using, for example, $LiTaO_3$, $LiNbO_3$ or the like. The Pockels device changes the polarization direction of light propagating in the device, in accordance with an applied electric field. The polarizer 54 is disposed being inclined by about 45° relative to the optical axis of the optic resonator 51. In accordance with a polarization direction of light incident upon the polarizer 54, a ratio of the light components transmitting through the polarizer 54 to the light components reflected by the polarizer 54 changes. The light components reflected by the polarizer 54 correspond to a loss of the optic resonator 51.

The electronic-optic device 80 is applied with the multiplied signal $sig_2$ of 2856 MHz from the RF gun 30. Since the electronic-optic device 80 changes its light polarization direction synchronously with the multiplied signal $sig_2$, the intensity of light components transmitting through the polarizer 54 change synchronously with the multiplied signal $sig_2$. Namely, a loss of light reciprocating in the optic resonator 51 changes synchronously with the multipled signal $sig_2$. The multiplied signal $sig_1$ output from the frequency converter 20 may be applied to the electronic-optic device 80. In this case, a loss of light reciprocating in the optic resonator 51 changes synchronously with the multiplied signal $sig_1$.

Figure 5:
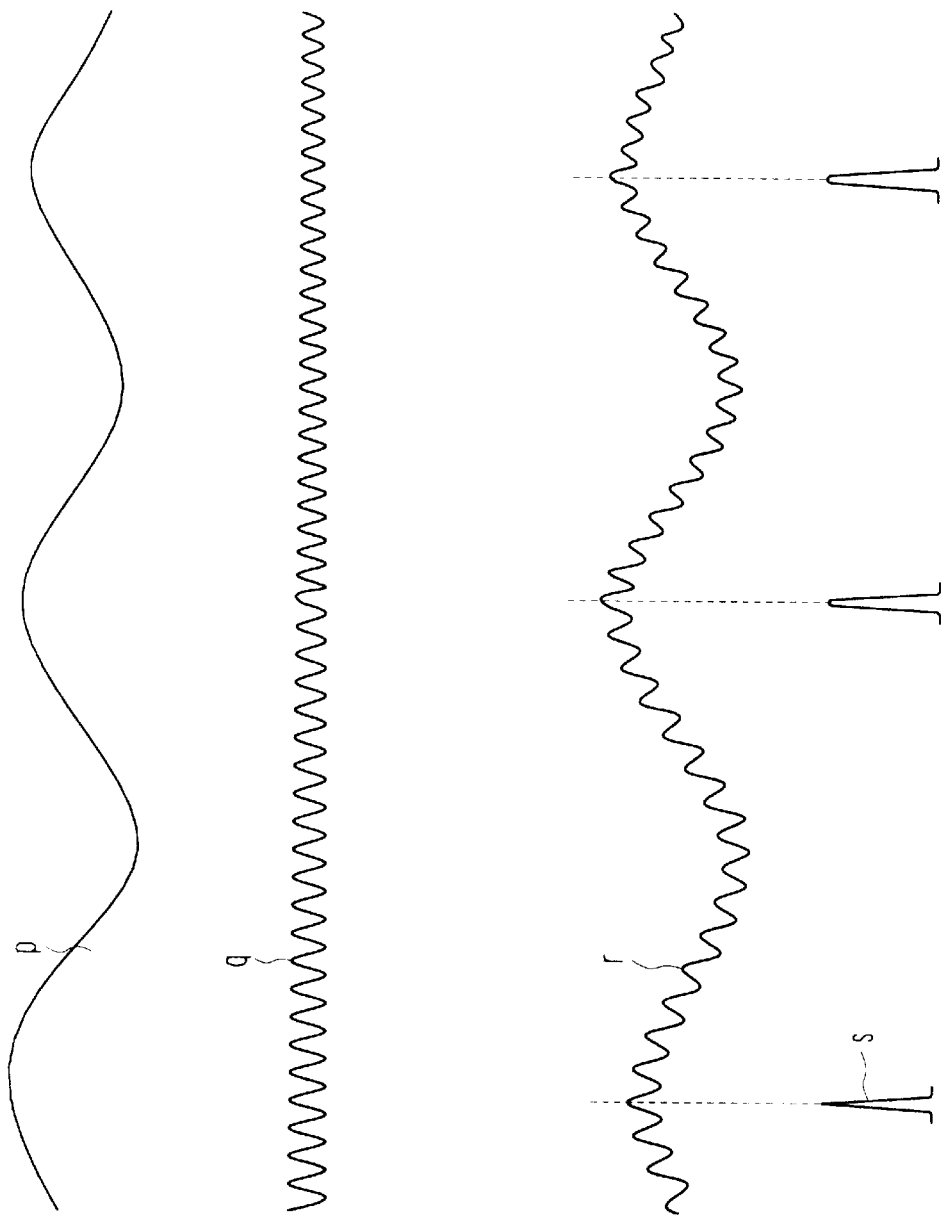
FIG. 5 is a graph illustrating an operation principle of the laser oscillator shown in FIG. 3.

FIG. 5 shows a phase relation among changes in the transmittances of the acoustic-optic device 70 and electronic-optic device 80 and a change in the intensity of the emitted laser beam. A curve p shows a change with time in the transmittance of the acoustic-optic device 70, a curve q shows a change with time in the transmittance of the electronic-optic device 80, and a curve r shows a change with time of the total transmittance of the two transmittances. A curve s shows a light intensity of the pulse laser beam $hv_0$ output from the laser oscillator 50.

Laser oscillation occurs at a point near each maximum value of the total transmittance of the curve r. Specifically, laser oscillation occurs in synchronization with or double-lock into both the change in the transmittance of the acoustic-optic device 70 and the change in the transmittance of the electronic optic device 80, as shown by the curve s. The transmittance p synchronizes with the RF signal $sig_1$ having a shifted phase of the master RF signal $sig_0$, and the transmittance q synchronizes with the multiplied signal $sig_2$. Therefore, the laser oscillator 50 emits a pulse laser beam in double-lock into both the master RF signal $sig_0$ and multiplied signal $sig_2$.

Referring again to FIG. 1, the RF gun 30 and laser oscillator 50 both operate synchronously with the master RF signal $sig_0$. If synchronization of the electronic-optic device 80 is not performed, because of jitters in the frequency converter 20 it is difficult to synchronize, with high precision, the pulse laser beam having a repetition frequency of 119 MHz output from the laser oscillator 50 with the multiplied signal having a repetition frequency of 2856 MHz applied to the acceleration cavity of the RF gun 30. In the embodiment shown in FIG. 1, the laser oscillator 50 emits a laser beam synchronously not only with the master RF signal $sig_0$ but also with the multiplied signal $sig_2$ derived from the acceleration cavity 32 of the RF gun 30 shown in FIG. 2. It is therefore possible to synchronize highly precisely the pulse laser beam $hv_0$ applied to the photocathode 31 of the RF gun 30 with the RF electric field induced in the acceleration cavity 32.

In the above embodiment, the frequency of the master RF signal generated by the master oscillator is set to 119 MHz and the frequency of the multiplied signal is set to 2856 MHz. The other frequencies may be used with expected similar advantages.

Figure 6:
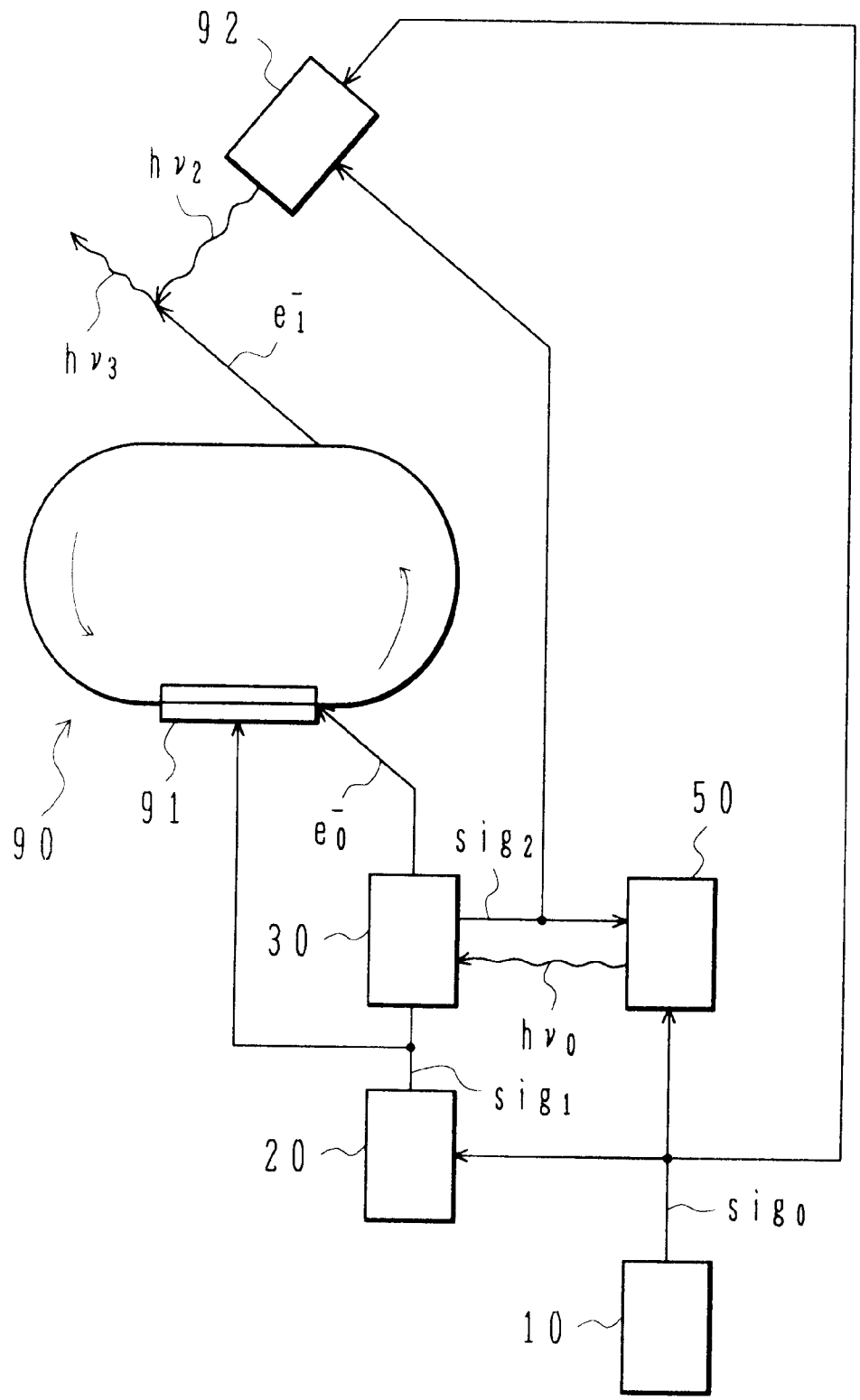
FIG. 6 is a block diagram of an electronic-laser system according to another embodiment of the invention.

Next, with reference to FIG. 6, an electronic-laser system for generating an ultra short pulse X ray using the electronic-laser system shown in FIG. 1 will be described.

The structures of a master oscillator 10, a frequency converter 20, an RF gun 30 and a laser oscillator 50 are the same as those of the electronic-laser system shown in FIG. 1. The electronic-laser system shown in FIG. 6 further includes an electron beam accelerator 90 and another laser oscillator 92.

The electron beam accelerator 90 is made of, for example, a microtron having a linear accelerator unit 91. A pulse electron beam $e_0$ emitted from the RF gun 30 is incident upon the accelerator unit 91 of the electron beam accelerator 90. An electron beam incident upon the right end of the accelerator unit 91 as viewed in FIG. 6 is returned when it emits from the left end. The returned electron beam again incident upon the left end of the accelerator unit 91 to form a race track orbit. Each time the electron beam circulates this orbit, it is accelerated by the accelerator unit 91. As it is accelerated, the radius of curvature of the race track orbit becomes large. As the electron beam is accelerated to a predetermined energy, it departs from the race track orbit and an accelerated electron beam $e_1$ is picked up.

The accelerator unit 91 is input with a multiplied signal $sig_1$ output from the frequency converter 20. Therefore, acceleration is performed synchronously with the multiplied signal $sig_1$ and the electron beam $e_1$ having a higher energy can be obtained. Also in this embodiment, the electron beam $e_1$ is in synchronization with or double-lock into both the master RF signal $sig_0$ and multiplied signal $sig_2$ with high precision.

The laser oscillator 92 has the same structure as the laser oscillator 50 shown in FIG. 3. The laser oscillator 92 is input also with the master RF signal $sig_0$ and multiplied signal $sig_2$, and a pulse laser beam $hv_2$ is obtained synchronously with both the signals. The laser oscillator 92 is installed at the position capable of making the output pulse laser beam $hv_2$ collide with the pulse electron beam $e_1$. By making the electron beam $e_1$ collide with the laser beam $hv_2$, an ultra short pulse X ray $hv_3$ can be generates.

There is a predetermined time lag until the electron beam $e_0$ output from the RF gun 30 is accelerated and reaches the collision position. The laser oscillator 92 delays the input master RF signal $sig_0$ and multiplies signal $sig_2$ by a time period corresponding to the time lag, and emits a laser beam synchronously with these delayed signals. The pulse electron beam $e_1$ and pulse laser beam $hv_2$ are highly precisely synchronized with or double-locked into both the master RF signal $sig_0$ and multiplied signal $sig_2$. Therefore, a collision probability between the electron beam $e_1$ and laser beam $hv_2$ can be increased.

The present invention has been described in connection with the preferred embodiments. The invention is not limited only to the above embodiments. It is apparent that various modifications, improvements, combinations, and the like can be made by those skilled in the art.

What is claimed is:

1. An electric-laser system comprising:
    master signal generating means for generating a master radio-frequency signal;
    a frequency converter for receiving the master radio-frequency signal output from said master signal generating means and generating a multiplied signal having a frequency higher than the master radio-frequency signal by using the master radio-frequency signal; and
    a laser oscillator whose loss of light reciprocating in an optic resonator of said laser oscillator is controlled by both the master radio-frequency signal output from said master signal generating means and the multiplied signal output from said frequency converter.

2. An electric-laser system according to claim 1, wherein said laser oscillator includes an acoustic-optic device disposed along an optical path of the optic resonator for changing a transmittance synchronously with the master ratio-frequency signal.

3. An electric-laser system according to claim 2, wherein said laser oscillator further includes an electronic-optic device disposed along the optical path of the optic resonator for changing a polarization direction of light synchronously with the multiplied signal and a polarizer disposed along the optical path of the optic resonator and having a different transmittance for each polarization direction of light.

4. An electric-laser system according to claim 3, further comprising a timing stabilizer for detecting a phase shift between a laser pulse output from said laser oscillator and the master radio-frequency signal, shifting a phase of the master radio-frequency signal in accordance with the detected phase shift, and applying the phase shifted radio-frequency signal to the acoustic-optic device.

5. An electric-laser system according to claim 4, wherein said timing stabilizer changes a length of the optic resonator of said laser oscillator in accordance with the detected phase difference.

6. An electric-laser system according to claim 2, further comprising a timing stabilizer for detecting a phase shift between a laser pulse output from said laser oscillator and the master radio-frequency signal, shifting a phase of the master radio-frequency signal in accordance with the detected phase shift, and applying the phase shifted radio-frequency signal to the acoustic-optic device.

7. An electric-laser system according to claim 6, wherein said timing stabilizer changes a length of the optic resonator of said laser oscillator in accordance with the detected phase difference.

8. An electric-laser system according to claim 1, further comprising an electron gun having a photocathode for emitting photoelectrons when a laser beam is applied to the photocathode and an acceleration cavity for accelerating the photoelectrons emitted from the photocathode, wherein a pulse laser beam output from said laser oscillator is applied to the photocathode, and the multiplied signal output from said frequency converter is applied to the acceleration cavity.

9. An electric-laser system according to claim 8, further comprising an accelerator for receiving an electron beam output from said electron gun and accelerating the input electron beam synchronously with the multiplied signal output from said frequency converter.

10. An electric-laser system according to claim 9, further comprising another laser oscillator whose loss of light reciprocating in an optic resonator is controlled by both the master radio-frequency signal output from said master signal generating means and the multiplied signal output from said frequency converter, and whose output pulse laser beam is disposed so as to collide with the electron beam output from said accelerator.

\* \* \* \* \*